Jan. 13, 1959     H. MAERKER     2,868,917

ROTATIONAL SPEED RESPONSIVE DEVICE

Filed Jan. 8, 1958

INVENTOR.

BY *Helmut Maerker*

United States Patent Office 2,868,917
Patented Jan. 13, 1959

2,868,917

ROTATIONAL SPEED RESPONSIVE DEVICE

Helmut Maerker, Santa Monica, Calif.

Application January 8, 1958, Serial No. 707,730

3 Claims. (Cl. 200—80)

The present invention relates to a rotational speed responsive device and, more particularly, to a rotational speed responsive device for a machine having a rotatable shaft.

An object of this invention is to provide a rotational speed responsive device for a machine having a rotatable shaft.

Another object of this invention is to provide a rotational speed responsive device for a machine having a rotatable shaft wherein switching operations may be effected at predetermined speeds of the rotatable shaft.

Still another object of this invention is to provide a rotational speed responsive device for a machine having a rotatable shaft, said device utilizing minimum space along the shaft, and wherein switching operations may be effected at predetermined speeds of the rotatable shaft.

A further object of this invention is to provide a switching device for a machine having a rotatable shaft.

A still further object of this invention is to provide a power switch for electric motors (and/or generators).

The foregoing objects and advantages will appear and be brought out more fully in the following specification, reference being had to the accompanying drawings, wherein.

Figure 1:
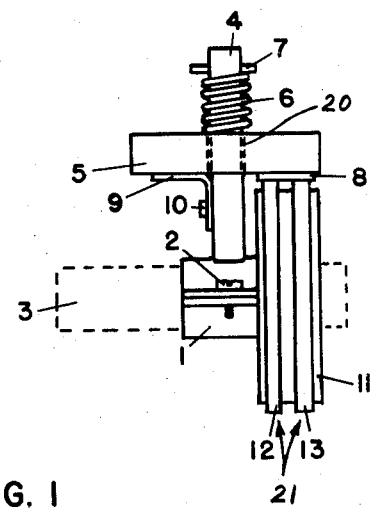
Fig. 1 illustrates, in elevation, one illustrative embodiment of the present invention showing the positioning of the rotational speed responsive device when the shaft of a machine to which the device if connected is rotating at low speed.
Figure 3:
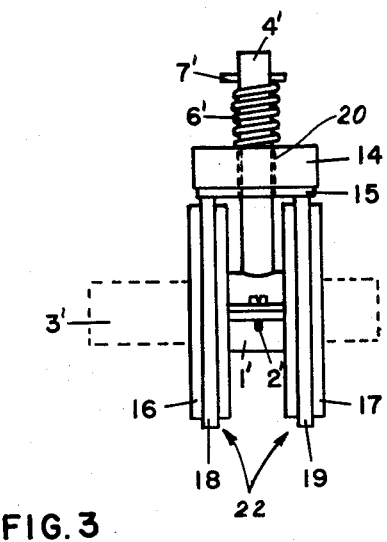
Figure 4:
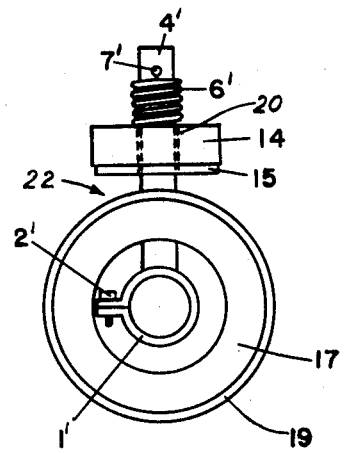

Fig. 3 is an elevational view similar to Fig. 1 but shows a very slight modification of the rotational speed responsive device in the position which it assumes when the shaft of the machine to which the device if connected is rotating at low speed; and Fig. 4 is a right end elevational view of the apparatus of Fig. 3 but shows the positioning of the rotational speed responsive device when the shaft of the machine is rotating at high speed.

Figure 2:
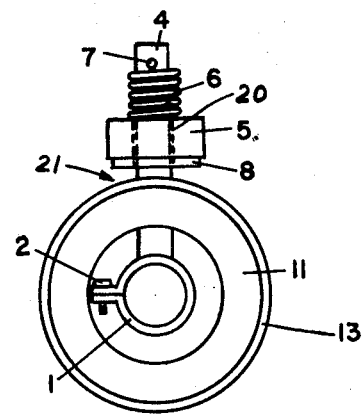
Fig. 2 is a right end elevational view of the apparatus of Fig. 1 but shows the positioning of the rotational speed responsive device when the shaft of the machine is rotating at high speed.

Referring, more particularly, to Figs. 1 and 2 there is shown a shaft 3 of a machine (not shown) of the type having a rotatable shaft. Said machine may be an electric motor (or generator) or any other type of apparatus having a rotating shaft. Fixedly connected to the shaft 3 to rotate therewith is a coupler 1 encircling a portion of the shaft and lightly secured thereto by a bolt 2 engaging threaded holes in the end flange portions of the coupler 1. A coupler shaft 4 is fixedly connected to the coupler 1; said coupler shaft 4 and said coupler 1 together forming a support member for a weight member 5. Coupler shaft 4 is preferably square or rectangular in cross section and extending through a similarly shaped aperture 20 in the weight member 5, although both the cross-sectional configuration of the coupler shaft 4 and the aperture 20 in the weight member 5 may be shaped in any desired manner which will relatively rotatably immobilize them. In other words, the weight member 5 is preferably keyed for non-rotation (but allowing longitudinal slidable movement) with respect to the coupler shaft 4. The shaft 3 rotates about its axis, which is essentially perpendicular to the axis of the support member, which is along the length of the coupler shaft 4. It should be noted that a small portion of the shaft 3, i. e., the space on the shaft 3 necessary for attaching the coupler 1, is utilized, thereby being an advantage where greater motor shaft space is not available for attaching a rotational speed responsive device. For example, existing machines having rotatable shafts may only have a small portion of shaft space available or accessible, and the rotational speed responsive device of this invention may be attached thereto very easily.

The weight member 5 comprises a material of a relatively heavy mass commensurate with the spring constant of spring 6 and the operating rotational speeds of shaft 3. Weight member 5 may be of the substantially rectangular shape shown or of virtually any desired shape. The coil spring 6 encircles the coupler shaft 4 and has its axis coincident with that of said coupler shaft 4. One end of the spring 6 is fixedly connected with respect to (such as by abutment or otherwise) the weight member 5, and the other end of the spring 6 abuts a cross pin 7 carried by the end of the coupler shaft 4. It is to be understood that any convenient means known in the prior art for fixedly attaching the spring 6 to the coupler shaft 4 may be utilized. Also the arrangement may be tensional, compressional, torsional, etc. In all of the embodiments referred to herein, the weight member has a hole in the center portion thereof to allow said weight member to move in a perpendicular direction with respect to the axis 3 along the axis of the coupler shaft 4 of the support member.

The operation of the portion of the apparatus referred to above may be briefly described as follows. As the shaft 3 rotates, the support member which is attached thereto, and comprising the coupler 1 and coupler shaft 4, will also rotate around the axis of the shaft 3. As the shaft 3 rotationally accelerates, centrifugal force exerted on the weight member 5 will move it against the restraining force of spring 6 away from the axis of shaft 3 and along the axis of coupler shaft 4. After shaft 3 is rotating at a fixed speed, the weight member 5 will assume a fixed position depending upon the weight of the weight member 5, the rotational speed of the shaft 3, and the spring constant of the spring 6. At any fixed rotational speed of the shaft 3, the centrifugal force on the weight member 5 will be constant. If the shaft 3 is rotatively decelerating, the centrifugal force on the weight member 5 will diminish and it will move toward the axis of the shaft 3 along the coupler shaft 4. Accordingly, the rotational speed of the shaft 3 fixes the positioning of the weight member 5.

Also, Figs. 1 and 2 show a means responsive to the position of the weight member, which includes fixed support means 11 of circular configuration circumferentially carrying spaced conductive slip rings 12 and 13 in a concentric position around the shaft 3. The lower surface of the weight member 5 carries a shorting bar 8 positioned so as to be capable of shorting contact with the conductive slip rings 12 and 13, when the weight member 5 is in the position shown in Fig. 1. It should be noted that the two axially spaced conductive rings 12 and 13 may be said to comprise slip-ring switch means indicated generally at 21, adapted to be closed by the shorting bar 8 carried by the weight member 5.

The operation of the apparatus referred to above may be briefly described as follows. When the shaft 3 is not rotating (or is rotating at low speed), the weight member 5 will be in the position shown in Fig. 1 and said weight member 5 will rest against a bracket or shoulder member 9 fastened to the coupler shaft 4 by fastening means 10. The shoulder or bracket 9 acts to prevent the weight member 5 from moving closer to the shaft 3 than shown in Fig. 1. It will be noted that when in the low speed position shown in Fig. 1 with the shaft 3 slowly rotating or stopped, the shorting bar 8 will short the conductive slip rings 12 and 13, which effectively closes the slip-ring switch means indicated generally at 21. As the shaft 3 is accelerated, centrifugal force causes the weight member 5 to move away from the shaft 3 and also away from the shoulder or bracket 9 into the position shown in Fig. 2. This also causes the shorting bar 8 to move to a position out of shorting contact with the conductive slip rings 12 and 13, which thus has the effect of opening the slip-ring switch means indicated generally at 21. This high speed position is clearly shown in Fig. 2.

It is to be noted that the position of the shorting bar 8 and the conductive slip rings 12 and 13 may be altered so that the conductive slip rings 12 and 13 may be circularly positioned so as to be circularly spaced outside the weight member 5 and so that the shorting bar 8 may be positioned on the outside of the weight member 5. In this case, the switching operation will be reversed, i. e., the slip-ring switch means will be open at low shaft speeds and closed at higher shaft speeds.

As an example of a use of this rotational speed responsive device, a single phase capacitor-start motor requires a capacitor to split the single phase current applied to the motor when starting. After the motor has attained operating speed, then the capacitor should be removed from the circuit as the single phase applied current will operate the motor. The rotational speed responsive device of this invention may be utilized to perform this function.

Figs. 3 and 4 illustrate a very slight modification of the form of the present invention shown in Figs. 1 and 2. In this modification, identical parts will be indicated by the same reference numerals, primed however, and similar parts will be indicated by new reference numerals. In this modification, the slip-ring switch means indicated generally at 22 is carried by fixed support means (consisting of two supports 16 and 17) generally similar to the fixed hollow circular support means 11 shown in the first form of the present invention; each of said supports 16 and 17 circumferentially carrying a circular conductive slip ring 18 and 19, respectively; said slip rings 18 and 19 being generally similar to the conductive slip rings 12 and 13 in the first form of the present invention. However, it should be noted that, in this modification, the supports 16 and 17 and the conductive slip rings 18 and 19, respectively, carried thereby are positioned on opposite sides of the coupler shaft 4'. Also in this modification, a weight member 14 is provided, which is generally similar to the weight member 5 shown in the first form of the present invention, and carries a shorting bar 15 generally similar to the shorting bar 8 of the first form of the present invention except that it is longer and extends the greater distance necessary to make electrical contact with the conductive slip rings 18 and 19, which are positioned on opposite sides of the coupler shaft 4'. This modification of the invention operates in substantially the same manner as the first form of the invention shown in Figs. 1 and 2 and described in detail hereinabove. Therefore, no additional detailed description of the mode of operation of this modification is thought necessary.

It should be noted that this is a division of copending patent application Serial No. 441,762, filed July 7, 1954, resulting in U. S. Patent No. 2,821,590, issue date January 28, 1958.

Numerous modifications and variations of the present invention will occur to those skilled in the art after a careful study hereof. All such properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A rotational speed responsive device for a machine having a rotatable shaft, said device comprising: a support member perpendicularly connected to and rotatable with said shaft; a compression spring mounted on said support member and having one end thereof connected to said support member adjacent the end of said support member most remote from said shaft; a centrally apertured weight member slidably mounted on said shaft and abutting a second end of said compression spring whereby said weight member will move in a perpendicular direction away from said shaft, against the inwardly radially biasing action of said compression spring, due to centrifugal force acting on said weight member when said shaft is rotatably accelerating; and means responsive to the position of said weight member, said means including fixed support means having a circular convex exterior concentrically encircling said rotatable shaft and radially spaced outwardly therefrom a predetermined distance, slip-ring switch means circularly connected to said circular convex exterior of said fixed support means for engaging, parallel to said rotatable shaft, said weight member when in a predetermined position radially spaced outwardly from said shaft by said predetermined distance corresponding to a predetermined compression of said spring and a predetermined minimum rotational speed of said rotatable shaft.

2. The device according to claim 1 wherein said weight member directly shorts said slip-ring switch means in a direction parallel to said rotatable shaft when in said predetermined position.

3. The device according to claim 2 which additionally includes a fixed support parallel to said rotatable shaft and radially spaced outwardly from said rotatable shaft by substantially said predetermined distance and substantially perpendicularly connected to the support member and preventing the weight member from moving toward the shaft from said predetermined position.

References Cited in the file of this patent

UNITED STATES PATENTS

| 891,282 | McHugh | June 23, 1903 |
| 1,444,825 | Banzhof | Feb. 13, 1923 |
| 2,623,979 | Shewmon | Dec. 30, 1952 |
| 2,624,814 | Shewmon | Jan. 6, 1953 |
| 2,821,590 | Maerker | Jan. 28, 1958 |